(12) United States Patent
Mincu et al.

(10) Patent No.: US 11,739,688 B2
(45) Date of Patent: Aug. 29, 2023

(54) TURBOJET COMPRISING A NACELLE WITH AN AIR INTAKE FOR PROMOTING A REVERSE THRUST PHASE

(71) Applicant: SAFRAN AIRCRAFT ENGINES, Paris (FR)

(72) Inventors: Daniel-Ciprian Mincu, Moissy-Cramayel (FR); Mathieu Patrick Jean-Louis Lallia, Moissy-Cramayel (FR); Nicolas Joseph Sirvin, Moissy-Cramayel (FR); Jagoda Alina Worotynska, Moissy-Cramayel (FR); Frédéric Dautreppe, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 17/600,550

(22) PCT Filed: Apr. 8, 2020

(86) PCT No.: PCT/EP2020/060035
§ 371 (c)(1),
(2) Date: Sep. 30, 2021

(87) PCT Pub. No.: WO2020/212226
PCT Pub. Date: Oct. 22, 2020

(65) Prior Publication Data
US 2022/0170417 A1 Jun. 2, 2022

(30) Foreign Application Priority Data
Apr. 17, 2019 (FR) ..................................... 1904092

(51) Int. Cl.
*F02C 7/042* (2006.01)
*B64D 33/02* (2006.01)
*F02K 1/64* (2006.01)

(52) U.S. Cl.
CPC .............. *F02C 7/042* (2013.01); *B64D 33/02* (2013.01); *F02K 1/64* (2013.01)

(58) Field of Classification Search
CPC ........... F02C 7/042; F02K 1/66; B64D 33/02
See application file for complete search history.

(56) References Cited

U.S. PATENT DOCUMENTS

| 3,446,223 A | 5/1969 | Hancock |
| 3,662,556 A | 5/1972 | Poucher et al. |

(Continued)

FOREIGN PATENT DOCUMENTS

| GB | 1228806 A | 4/1971 |
| GB | 1565212 A | 4/1980 |
| WO | WO 2015/130384 A2 | 9/2015 |

OTHER PUBLICATIONS

Search Report from the French Intellectual Property Office on corresponding FR application (FR1904092) dated Nov. 29, 2019.

(Continued)

*Primary Examiner* — Lorne E Meade
(74) *Attorney, Agent, or Firm* — KOS IP Law LLP

(57) ABSTRACT

An aircraft turbojet engine comprising a fan configured to provide a reverse thrust and a nacelle comprising an air intake, the air intake comprising at least one circulation duct in the annular cavity opening, on the one hand, at the air intake lip and, on the other hand, at the inner wall and/or the outer wall so as to promote a reverse thrust phase, the air intake comprising at least one cover member mounted to move between a covered position, in which the cover member closes the circulation duct at the air intake lip and an uncovered position, in which the cover member opens the circulation duct at the air intake lip.

16 Claims, 9 Drawing Sheets

(56) References Cited

U.S. PATENT DOCUMENTS

| | | | | |
|---|---|---|---|---|
| 3,729,934 | A * | 5/1973 | Denning | F02K 1/66 |
| | | | | 415/130 |
| 3,900,177 | A * | 8/1975 | Calder | F01D 5/022 |
| | | | | 60/262 |
| 4,482,114 | A | 11/1984 | Gupta et al. | |
| 8,839,805 | B2 * | 9/2014 | Zysman | F02C 7/04 |
| | | | | 60/226.3 |
| 10,337,455 | B2 * | 7/2019 | Burd | F02K 3/06 |
| 2016/0312741 | A1 * | 10/2016 | Burd | F01D 25/02 |
| 2018/0280297 | A1 * | 10/2018 | Buge | A61K 31/402 |

OTHER PUBLICATIONS

International Search Report and Written Opinion on corresponding PCT application (PCT/EP2020/060035) from International Searching Authority (EPO) dated May 25, 2020.

* cited by examiner

TURBOJET COMPRISING A NACELLE WITH AN AIR INTAKE FOR PROMOTING A REVERSE THRUST PHASE

TECHNICAL FIELD

The present invention relates to the field of aircraft turbojet engines and is more particularly directed to an air intake of an aircraft turbojet engine nacelle.

In a known manner, an aircraft comprises one or more turbojet engines to enable its propulsion by acceleration of an air flow that circulates from upstream to downstream in the turbojet engine.

With reference to FIG. 1, a turbojet engine 100 extending along an axis X and comprising a fan 101 rotatably mounted about axis X in an external shell 102 in order to accelerate, during the thrust phase of the turbojet engine 100, an air flow circulating from upstream to downstream in the turbojet engine 100, referred to as the internal air flow F-INT. Hereinafter, the terms "upstream" and "downstream" are defined with respect to the circulation of the internal air flow F-INT.

In a known manner, the turbojet engine 100 comprises a nacelle comprising, at its upstream end, an air intake 200 comprising an internal wall 201 pointing to axis X, and an external wall 202 opposite to the internal wall 201. The internal wall 201 and the external wall 202 are connected together by an air intake lip 203, comprising a leading edge, so as to form an annular cavity 220. The air intake 200 has an aerodynamic profile for separating an upstream air flow F between the internal air flow F-INT guided by the internal wall 201 and an external air flow F-EXT guided by the external wall 202. Hereinafter, the terms "internal" and "external" are defined radially with respect to axis X of the turbojet engine 100.

In order to reduce the braking distance of an aircraft, especially during landing, it is known to integrate in a nacelle a thrust reversal system that makes it possible to modify the orientation of the air flow at the exhaust so as to perform a thrust reversal phase. In a known manner, the thrust reversal phase is achieved by opening flaps/grilles in the secondary stream, downstream of the straighteners, in order to conduct the air flows radially outwardly or upstream.

For a high bypass ratio turbojet, the nacelle has a large diameter and it is not desired to integrate a conventional thrust reversal system since this would be significantly detrimental to the weight, overall size and drag of the turbojet engine.

To enable a thrust reversal phase, another solution consists in providing a variable pitch fan, or VPF, so as to enable the air flow circulating in the secondary stream of a turbojet engine to be reversed and thus create a reverse thrust enabling the aircraft to be decelerated during landing or any other maneuver.

With reference to FIG. 2, during the thrust reversal phase, a reverse air flow F-INV circulates from downstream to upstream in the turbojet engine 100, that is, reversely to the internal air flow F-INT of FIG. 1. More precisely, the reverse air flow F-INV circulates in the vicinity of the external shell 102. The reverse air flow F-INV is guided upstream by the internal wall 201 in a direction substantially axial to axis X. This reverse air flow F-INV then opposes the upstream air flow F, which allows the thrust reversal phase.

In practice, as illustrated in FIG. 2, part of the reverse air flow F-INV bypasses the aerodynamic profile of the air intake 200 in a substantially radial direction, which leads to the occurrence of a zone of local depression P in the vicinity of the air intake lip 203. Such a local depression P generates an upstream suction, that is, a force that opposes the thrust reversal. In practice, this phenomenon reduces the performance of the thrust reversal phase very significantly.

The invention thus aims at reducing this phenomenon in order to increase the performance of the turbojet engine during the thrust reversal phase without affecting the performance of said aircraft during the thrust phase.

In prior art, from U.S. Pat. Nos. 3,618,876, 3,222,863 and 3,664,612 an air intake whose upstream portion pivots inwardly or outwardly or moves upstream is known. Such an upstream part creates several circulation conduits opening on the one hand on the upper surface (external wall) and on the other hand on the lower surface (internal wall), in order to avoid a separation of the internal air flow from the internal wall under unfavorable conditions, especially during takeoff or with a slant wind. Such a movable upstream part does not promote the thrust reversal phase.

From patent applications U.S. Pat. No. 3,446,223A1, U.S. Pat. No. 3,662,556A1 and GB1228806A1, an air intake with through openings between the internal wall and the external wall that are closed by flaps, which are opened under some operating conditions during the thrust phase in order to reduce noise or improve air supply is also known. Via patent application VV02015130384A2, an air intake with one or more fluidic control passages opening especially upstream to limit the separation of the air flow supplied in the thrust phase is also known. A grid can be placed to avoid ingestion of foreign bodies while allowing the air supply in the thrust phase. Such air intakes do not promote the thrust reversal phase.

SUMMARY

The invention relates to an air intake of an aircraft turbojet engine nacelle extending along an axis X oriented from upstream to downstream, in which an internal air flow circulates from upstream to downstream during a thrust phase, and a reverse air flow from downstream to upstream during a thrust reversal phase, the air intake circumferentially extending about axis X and comprising an internal wall pointing to axis X, and configured to guide the internal air flow and the reverse air flow, and an external wall, opposite to the internal wall and configured to guide an external air flow, the internal wall and the external wall being connected together by an air intake lip, so as to form an annular cavity.

The invention is remarkable in that the air intake comprises at least one circulation conduit in the annular cavity opening, on the one hand, at the air intake lip and, on the other hand, at the internal wall and/or the external wall so as to promote a thrust reversal phase.

By virtue of the invention, the reverse air flow is deflected at the air intake lip and/or the local depression at the air intake lip is reduced, which makes it possible to prevent the air flow from generating a force opposing the reverse thrust, as in prior art.

According to one preferred aspect, the air intake comprises a plurality of circulation conduits distributed at the circumference of said air intake about axis X. According to one aspect, all of the conduits may be used together in order to allow a homogeneous thrust reversal phase over the circumference of the air intake, favorable under some operating conditions, such as during braking. According to another aspect, the conduits may be open to varying degrees to allow a heterogeneous thrust reversal phase, favorable under other operating conditions over the circumference of the air intake, in order to control recirculation of the reverse air flow.

According to another preferred aspect, the air intake comprises a single circulation conduit circumferentially extending about axis X, in order to optimize the reverse thrust phase over the entire circumference of the air intake.

Preferably, the air intake comprises at least one cover member movably mounted between a covered position, in which said cover member closes the circulation conduit at the air intake lip, and an uncovered position, in which said cover member opens the circulation conduit at the air intake lip. The performance of the turbojet engine during the thrust phase is thus not reduced.

Preferably, the air intake comprises at least one upstream cover member movably mounted between a covered position, in which said upstream cover member closes the circulation conduit at the air intake lip, and an uncovered position, in which said upstream cover member opens the circulation conduit at the air intake lip. The performance of the turbojet engine during the thrust phase is thus not reduced.

Preferably, the air intake comprises at least one downstream cover member movably mounted between a covered position, in which said downstream cover member closes the circulation conduit at internal wall or the external wall, and an uncovered position, in which said downstream cover member opens the circulation conduit at the internal wall or the external wall. Thus, the performance of the turbojet engine during the thrust phase is not reduced.

Preferentially, the air intake comprises at least one controllable moving member in order to move at least one cover member (upstream and/or downstream) from the covered position to the uncovered position.

Preferentially, the controllable moving member makes it possible to move at least one upstream cover member and/or at least one downstream cover member from the uncovered position to the covered position.

Preferentially, the upstream and/or downstream cover member is configured to be moved from the covered position to the uncovered position under the action of an air flow, not requiring additional power to be supplied by the aircraft.

Preferentially, the upstream and/or downstream cover member is configured to be moved from the uncovered position to the covered position under the action of an air flow, not requiring an additional power supply to be supplied by the aircraft.

The invention also relates to an aircraft turbojet engine extending along an axis X oriented from upstream to downstream in which an internal air flow circulates from upstream to downstream during a thrust phase, and a reverse air flow from downstream to upstream during a thrust reversal phase, said turbojet engine comprising a fan so as to provide a reverse thrust and a nacelle comprising an air intake, as previously set forth, so as to promote said reverse thrust phase.

The invention further relates to a method for operating an air intake, as previously set forth, comprising, during a thrust reversal phase of said turbojet engine, a step of circulating an air flow in the circulation conduit from the internal wall and/or the external wall to the air intake lip in order to promote the thrust reversal phase. The circulation of an internal air flow advantageously allows a separation to be created at the air intake lip which avoids any depression as in prior art. The circulation of an external air flow makes it possible to balance the pressure at the air intake lip, thereby avoiding any depression as in prior art.

Preferably, the cover member is in a covered position during a thrust phase of the turbojet, so that the air intake has an aerodynamic profile so as to guide the internal air flow onto the internal wall. The method comprises, during a thrust reversal phase of said turbojet engine, a step of moving the cover member to an uncovered position to promote the thrust reversal phase.

Preferably, the upstream cover member is in a covered position during a thrust phase of the turbojet engine, so that the air intake has an aerodynamic profile so as to guide the internal air flow onto the internal wall. The method comprises, during a thrust reversal phase of said turbojet engine, a step of moving the upstream cover member to an uncovered position to promote the thrust reversal phase.

Preferably, the downstream cover member is in a covered position during a thrust phase of the turbojet engine, so that the air intake has an aerodynamic profile so as to guide the internal air flow on the internal wall or the external air flow on the external wall. The method comprises, during a thrust reversal phase of said turbojet engine, a step of moving the downstream cover member to an uncovered position in order to promote the thrust reversal phase.

BRIEF DESCRIPTION OF THE DRAWINGS

The invention will be better understood upon reading the following description, which is given solely by way of example, and refers to the appended drawings given as non-limiting examples, in which identical references are given to similar objects and in which.

It should be noted that the figures set out the invention in detail to implement the invention, said figures of course being able to serve to better define the invention if necessary.

DETAILED DESCRIPTION

Figure 1:
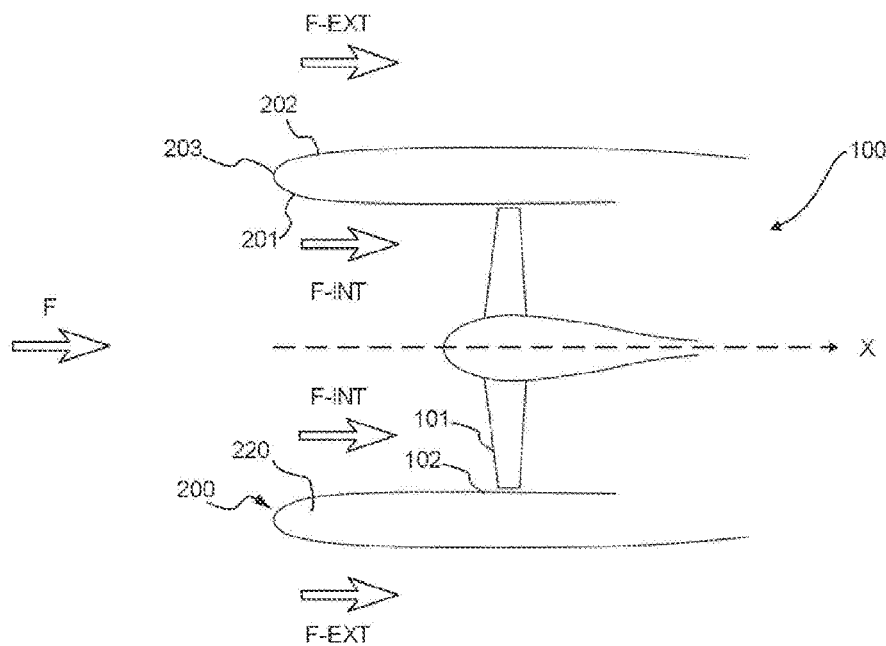
FIG. 1.
Figure 2:
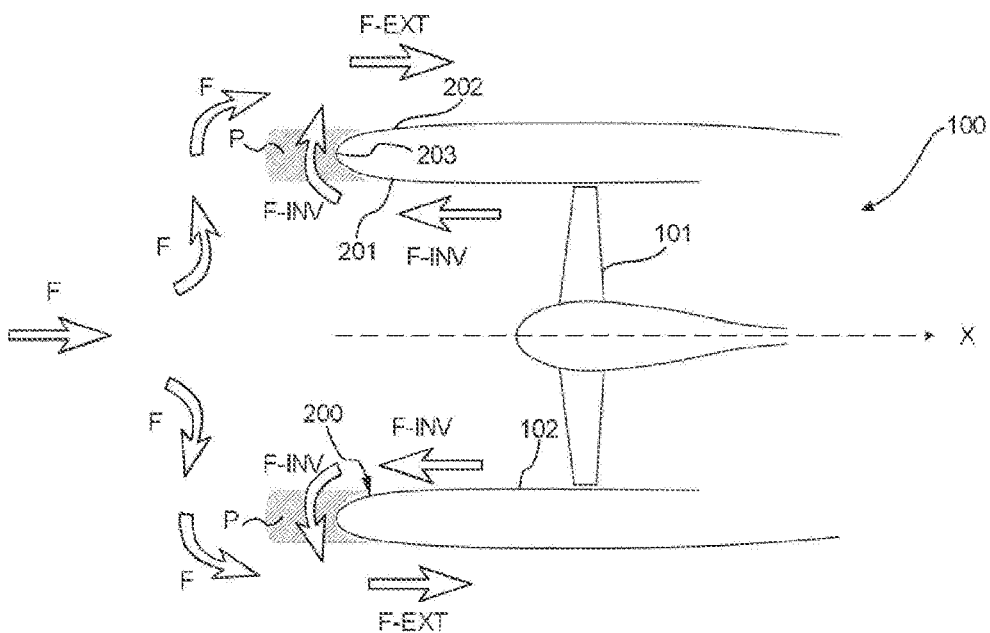
FIG. 2 are schematic representations in a longitudinal cross-section view of a turbojet engine nacelle according to prior art, in the thrust phase and in the thrust reversal phase respectively.
Figure 3:
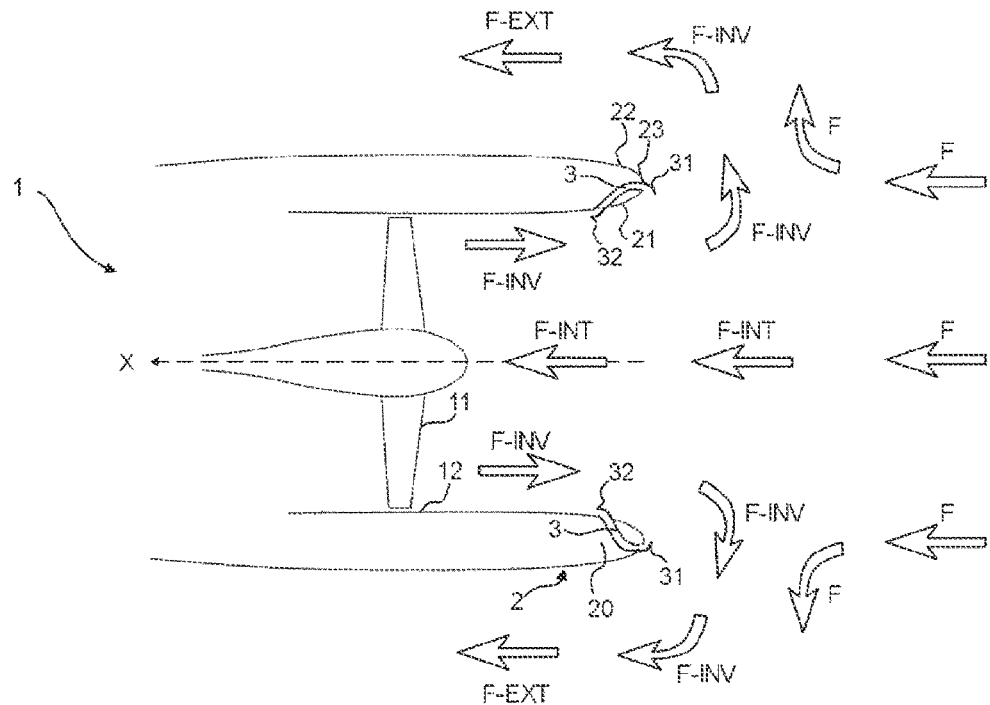
FIG. 3 is a schematic representation in a longitudinal cross-section view of a turbojet engine nacelle according to a first embodiment of the invention with a circulation conduit opening onto the internal wall.

With reference to FIG. 3, a turbojet engine 1 according to the invention is represented, extending along an axis X oriented from upstream to downstream and comprising a fan 11 rotatably mounted about axis X in an external shell 12 defining an air stream. In a known manner, the fan 11 is configured, during a thrust phase, to accelerate an air flow circulating from upstream to downstream in the turbojet engine 1, known as the internal air flow, and in the thrust reversal phase, to accelerate an air flow circulating from downstream to upstream in the turbojet engine 1, known as the reverse air flow F-INV.

In practice, as illustrated in FIG. 3, the reverse air flow F-INV circulates from downstream to upstream in a radially external portion of the air stream, in particular, over ⅓ of the air stream radius. An internal air flow F-INT always circulates from upstream to downstream in a radially internal portion of the air stream, in particular, over ⅔ of the air stream radius. The internal air flow F-INT ensures a sufficient flow rate to avoid any pumping phenomenon of the turbojet engine.

As illustrated in FIG. 3, the turbojet engine 1 comprises a nacelle which comprises at its upstream end an air intake 2 circumferentially extending about axis X and comprising an internal wall 21, pointing to axis X and configured to guide the internal air flow F-INT and the reverse air flow F-INV, and an external wall 22, opposite to the internal wall 21 and configured to guide an external air flow F-EXT, circulating from upstream to downstream. The internal wall 21 and the external wall 22 are connected to each other by an air intake lip 23, comprising a leading edge. The internal wall 21, the external wall 22 and the air intake lip 23 form an annular cavity 20 in which a sound attenuation device or a de-icing device can especially be mounted. The annular cavity 20 extends along a longitudinal direction X20 parallel to axis X.

In this example, the turbojet engine 1 comprises thrust reversing means, in particular, a variable pitch fan 11, or VPF, so as to make it possible to reverse the air flow circulating in the turbojet engine 1 and thus to create a reverse thrust allowing deceleration of the aircraft during landing, or during any other maneuver.

According to the invention, the air intake 2 comprises at least one circulation conduit in the annular cavity 20 opening, on the one hand, at the air intake lip 23 and, on the other hand, at the internal wall 21 and/or the external wall 22 so as to promote a reverse thrust phase.

In the following, according to a first embodiment, a conduit opening into the internal wall 21, then, according to a second embodiment, a conduit opening into the external wall 22 and, according to a third embodiment, a conduit opening into the internal wall 21 and into the external wall 22 will be set forth.

According to a first embodiment of the invention, with reference to FIG. 3, the air intake 2 comprises a plurality of circulation conduits 3 located in the annular cavity 20 and opening, on the one hand, at the air intake lip 23 and, on the other hand, at the internal wall 21. Each circulation conduit 3 is configured to circulate an air flow from one to the other of its two ends.

Figure 4:
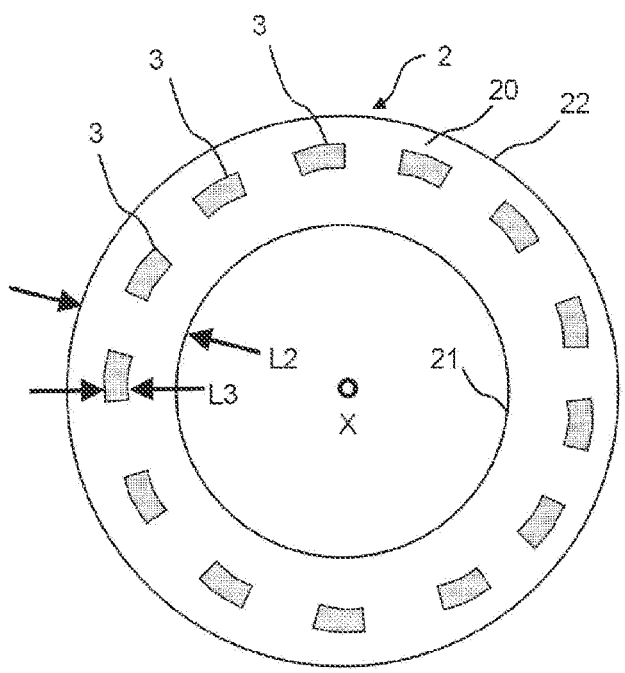
FIG. 4.
Figure 5:
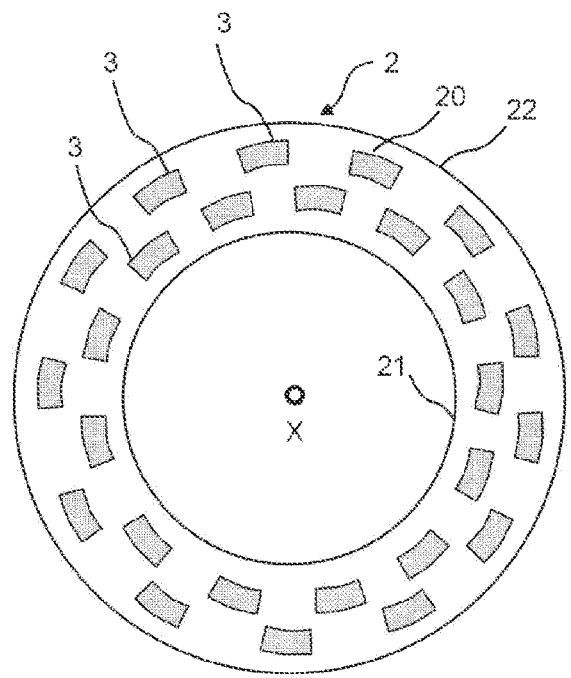
FIG. 5 are schematic representations in a transverse cross-section view of an air intake comprising one or two rows of circulation conduits, respectively.

As illustrated in FIGS. 4 and 5, the circulation conduits 3 are distributed at the circumference of the air intake 2 about axis X, in one row with axis X in the example of FIG. 4 and two rows staggered with respect to each other in the example of FIG. 5. Of course, the circulation conduits 3 can be distributed in a different number of rows. In these examples, the circulation conduits 3 are at the same radial distance from axis X, in other words the rows are circular. However, it goes without saying that the circulation conduits 3 may also be distributed differently at the circumference of the air intake 2, such as over part of the circumference of the air intake 2 only or heterogeneously, as examples.

Figure 6:
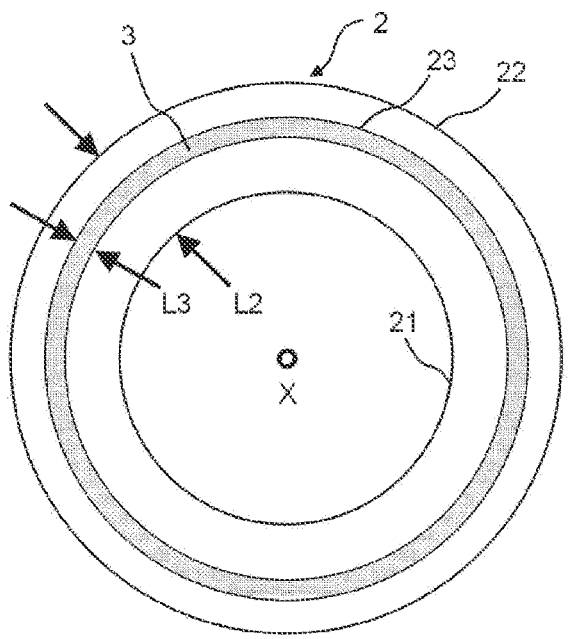
FIG. 6 is a schematic representation in a transverse cross-section view of an air intake comprising a circumferential circulation conduit.

In the example of FIG. 6, the air intake 2 comprises a single circulation conduit 3 extending over the circumference of the air intake 2 about axis X. In this example, the circulation conduit 3 extends circularly over the circumference of the air intake 2 in a transverse plane. Each of these configurations (FIGS. 4 to 6) advantageously allows some amount of air flow to circulate. The amount of air flow depends on the radial thickness of a circulation conduit L3, preferably in the order of 20% of the radial thickness of the air intake L2. In the case of FIGS. 4 and 5, it also depends on the azimuthal length and the azimuthal distance separating two circulation conduits 3. It should be noted that these two parameters can vary from one circulation conduit to the other, with a view to generating a heterogeneous reverse thrust over the circumference of the air intake 2, which is advantageous in some operating conditions, such as during braking. Preferably, a circulation conduit 3 is circular in shape for better guiding of the flows within the circulation conduit 3. However, it goes without saying that the circulation conduit is of any shape, such as rectangular in the example of FIGS. 4 and 5.

Figure 7A:
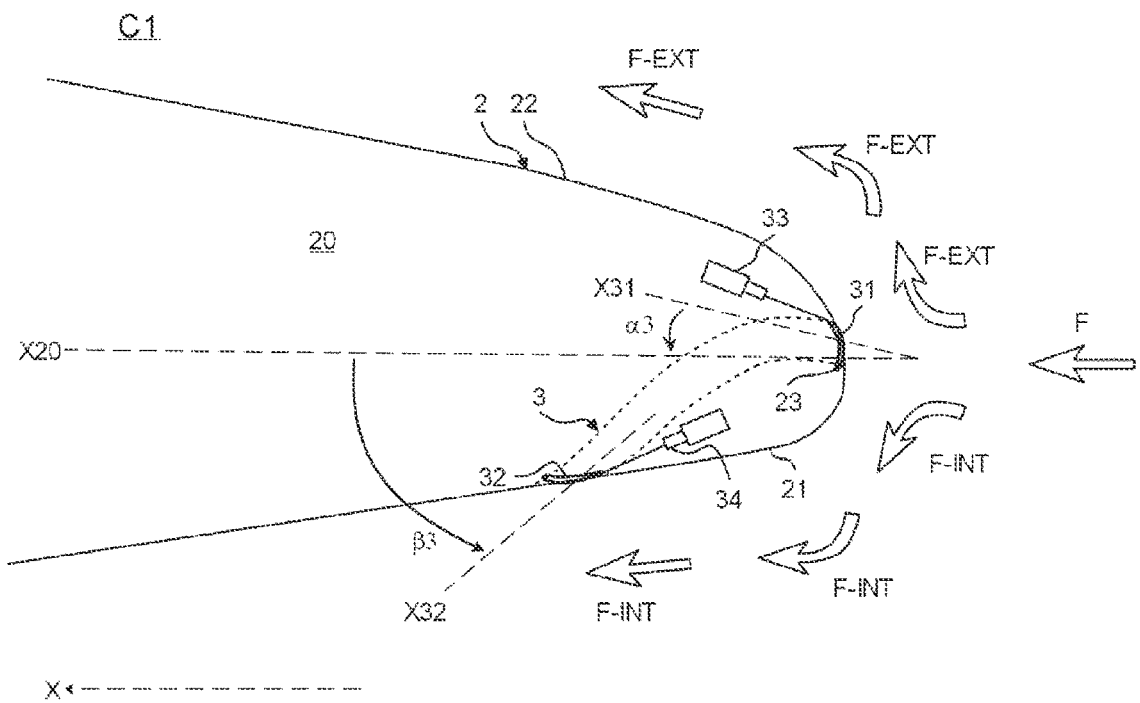
FIG. 7A.

Preferably, as illustrated in FIG. 7A, the circulation conduit 3 comprises an upstream end that opens at the air intake lip 23 along an upstream direction X31 with an upstream angle α3 with respect to the longitudinal direction X20, the upstream angle α3 preferably being between −45° and 45°. Preferably, the circulation conduit 3 comprises a downstream end that opens at the bottom wall 21 along a downstream direction X32 with a downstream angle β with respect to the longitudinal direction X20, the downstream angle β preferably being between 0° and 60°.

As will be set forth later, this advantageously makes it possible to create a reverse air flow circulation during the thrust reversal phase so as to limit the occurrence of a depression as in prior art at the air intake lip 23.

Figure 7B:
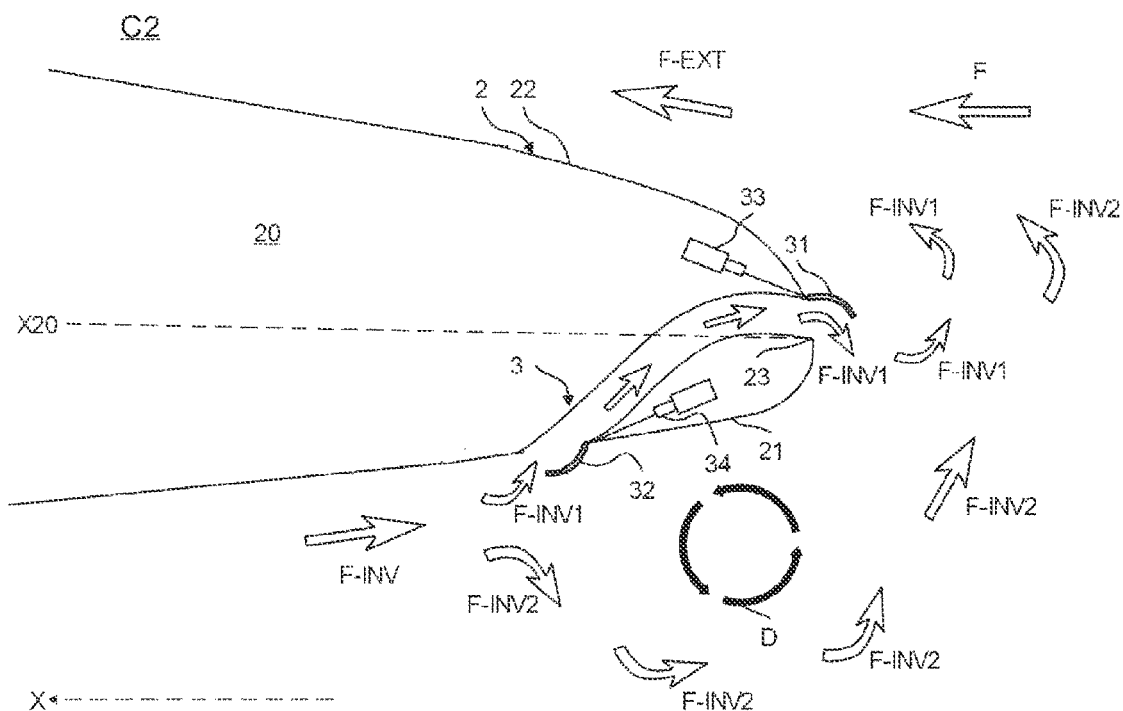
FIG. 7B are schematic representations in a longitudinal cross-section view of an air intake according to the first embodiment comprising controllable moving members at a covered position and an uncovered position respectively.

In this example, with reference to FIGS. 7A and 7B, the air intake 2 further comprises an upstream cover member 31 and a downstream cover member 32, which are movably mounted at the upstream end and the downstream end of the circulation conduit 3 respectively. It goes without saying that in the case of a plurality of circulation conduits 3, the air intake 2 comprises a plurality of upstream 31 and downstream 32 cover members. Likewise, it goes without saying that a circulation conduit 3 could comprise only one upstream cover member 31, only one downstream cover member 32 or neither.

Preferably, the cover members 31, 32 are rotatably mounted (FIGS. 7A and 7B), but it goes without saying that these cover members 31, 32 may be movably mounted for any motion, such as a translational motion as an example. Preferably, the upstream cover member 31 is mounted to the radially external edge of the upstream end of the circulation conduit 3, as represented in FIGS. 7A and 7B. Of course, however, the upstream cover member 31 may be mounted to the radially internal edge of the upstream end. Similarly, preferentially, the downstream cover member 32 is mounted to the upstream edge of the downstream end of the circulation conduit 3, as represented in FIGS. 7A and 7B. However, it is understood that the downstream cover member 32 may be mounted to the downstream edge of the downstream end.

According to one aspect of the invention and with reference to FIGS. 7A and 7B, the upstream cover member 31 is movably mounted between:
 a covered position C1 (FIG. 7A) in which the upstream cover member 31 closes the circulation conduit 3 at the air intake lip 23, in order to promote the thrust phase and
 an uncovered position C2 (FIG. 7B) in which the upstream cover member 31 opens the circulation conduit 3 at the air intake lip 23, in order to promote the thrust reversal phase.

Analogously, the downstream cover member 32 is movably mounted between:
 a covered position C1 in which the downstream cover member 32 closes the circulation conduit 3 at the internal wall 21, in order to promote the thrust phase and
 an uncovered position C2 in which the downstream cover member 32 opens the circulation conduit 3 at the internal wall 21, in order to promote the thrust reversal phase.

Preferably, the upstream cover member 31 and the downstream cover member 32 assume the same covered or uncovered position in order to promote the thrust phase and the thrust reversal phase. Thus, the air intake 2 allows for two different roles during the thrust phase and during the reverse thrust phase. As illustrated in FIG. 7A, in the covered position C1, the upstream 31 and downstream 32 cover members cover both ends of the circulation conduit 3, which makes it possible not to affect the aerodynamic performance of the air intake 2 which has an aerodynamic profile. In other words, the upstream air flow F separates at the air intake lip 23 into an internal air flow F-INT and an external air flow F-EXT in a manner similar to prior art. In this way, the thrust phase is optimized.

As illustrated in FIG. 7B, in the uncovered position C2, the upstream cover members 31 and downstream cover members 32 allow a part of the reverse air flow F-INV, noted auxiliary reverse air flow F-INV1, to circulate in the circulation conduit 3 and generate separation of the other part of the reverse air flow F-INV, noted main reverse air flow F-INV2. In other words, the reverse air flow F-INV is deviated from its trajectory running along the air intake lip 23, originating the reduction in the thrust reversal phase. The thrust reversal phase is thus improved.

Preferably, the upstream 31 and downstream 32 cover members are in the form of a flap of small thickness in order to generate a minimal overall size. Preferentially, the upstream cover members 31 and downstream cover members 32 have a slightly curved profile so as to have an aerodynamic profile similar to that of the air intake lip 23 and the internal wall 21 respectively. Preferentially, the material of the upstream 31 and downstream 32 cover members is identical to that of the air intake lip 23 and the internal wall 21, namely resistant to the aerodynamic forces involved.

Figure 7C:
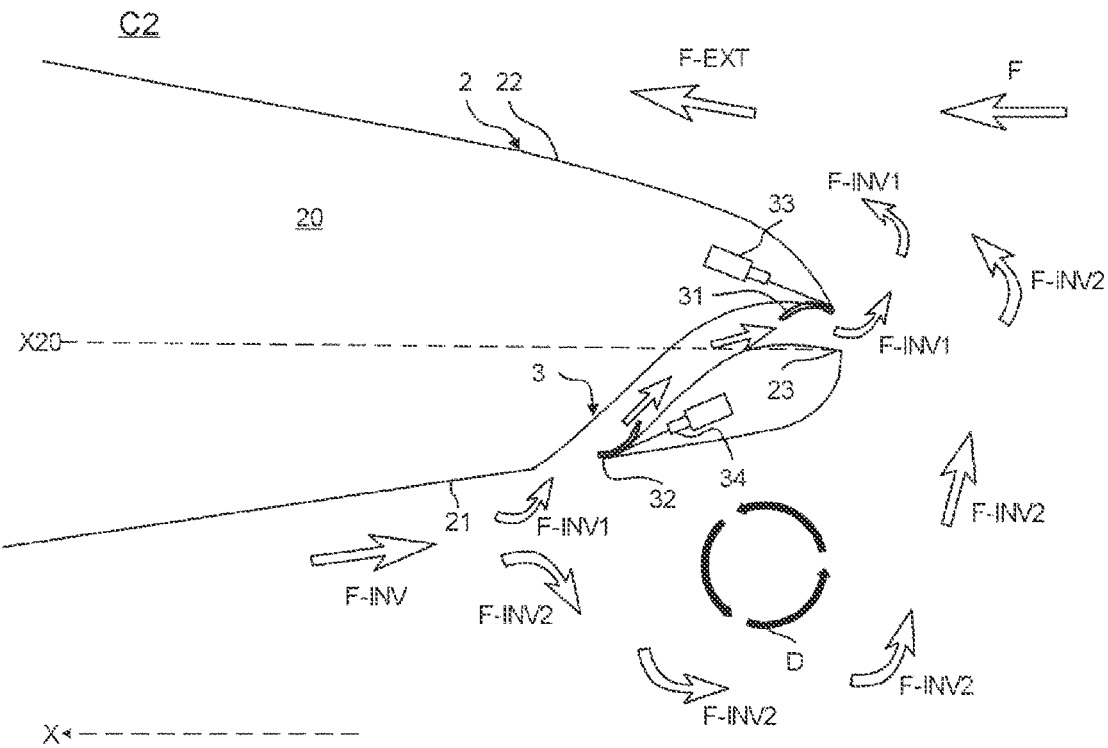
FIG. 7C.
Figure 7D:
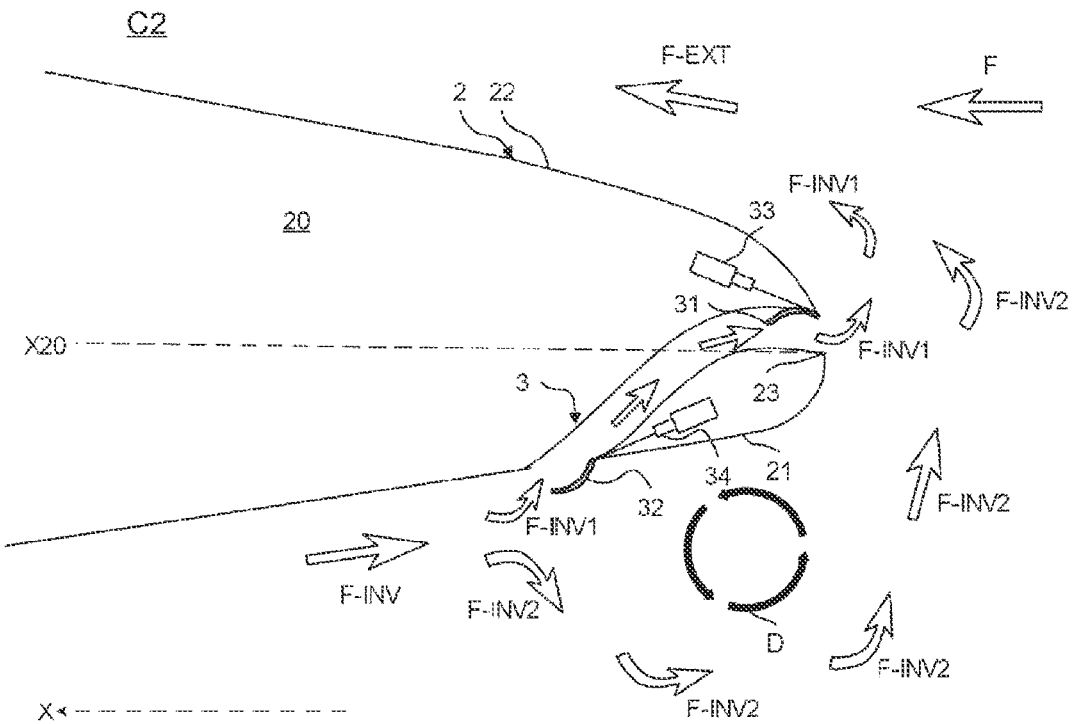
FIG. 7D.

According to one preferred aspect of the invention and as illustrated in FIG. 7B, in the uncovered position C2, the upstream cover members 31 and downstream cover members 32 extend externally to the circulation conduit 3 in order to guide the auxiliary reverse air flow F-INV1 towards the circulation conduit 3 and away from it respectively. According to another aspect of the invention and as illustrated in FIG. 7C, in the uncovered position C2, the upstream 31 and downstream 32 cover members extend internally to the circulation conduit 3 in order to generate a minimum overall size and not to degrade aerodynamics. According to another aspect of the invention and as illustrated in FIGS. 7D and 7E, in the uncovered position C2, a part of the cover members 31, 32 extends internally while the other part extends externally.

According to one aspect of the invention, with reference to FIGS. 7A, 7B, 7C and 7D, the air intake 2 comprises two controllable moving members 33, 34 for moving the upstream cover member 31 and the downstream cover member 32 from the covered position C1 to the uncovered position C2 respectively. Preferentially, the controllable moving members 33, 34 also make it possible to move the cover members 31, 32 from the uncovered position C2 to the covered position C1. It goes without saying that the same controllable moving member 33, 34 can move several cover members 31, 32. It also goes without saying that the number of controllable moving members 33, 34 is arbitrary. By way of example, the controllable moving members 33, 34 are in the form of a pneumatic, hydraulic, electric or other actuator in order to allow a movement as a result of receiving a control command from a calculator.

Figure 7E:
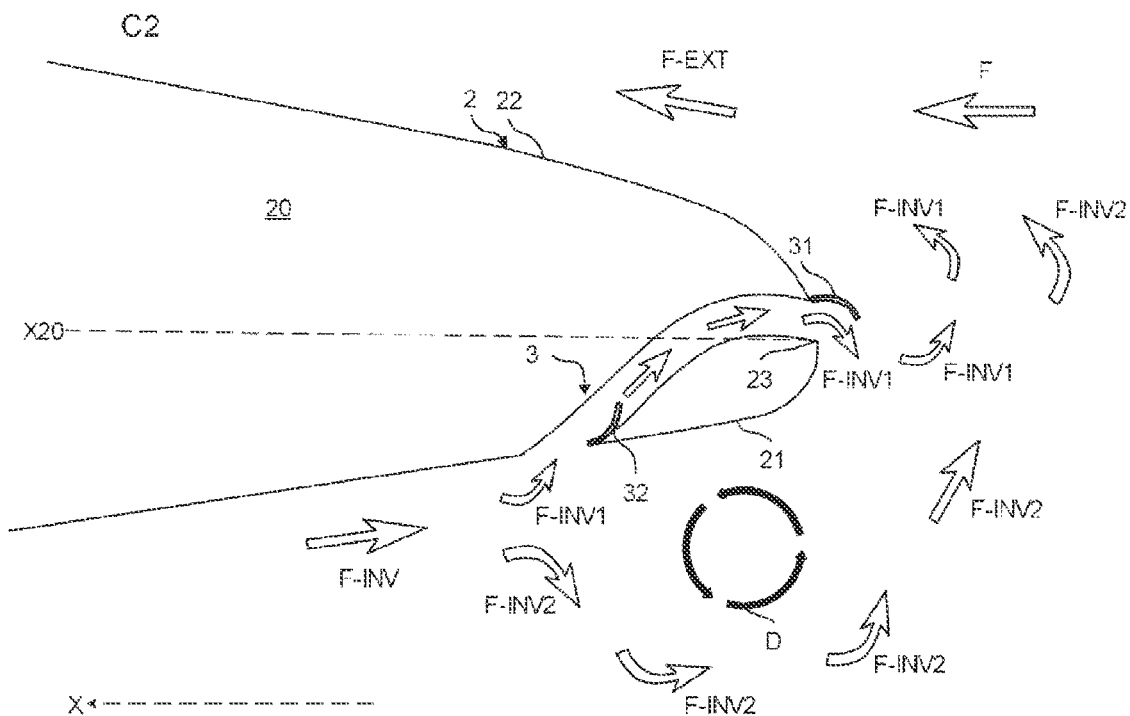
FIG. 7E are schematic representations in a longitudinal cross-section view of an air intake according to the first embodiment comprising controllable moving members at several uncovered positions.

According to another aspect of the invention, with reference to FIG. 7E, the upstream cover members 31 and downstream cover members 32 are configured to be moved by means of the aerodynamic forces involved. More specifically, the cover members 31, 32 are configured to be moved from the covered position C1 to the uncovered position C2 by the auxiliary reverse air flow F-INV1. Preferably, the cover members 31, 32 are configured to be moved from the uncovered position C2 to the covered position C1 by the upstream air flow F. This aspect of the invention has the advantage of judiciously utilizing kinetic energy of the air, not requiring additional energy input. It goes without saying that one part of the cover members 31, 32 can be moved by means of the controllable moving members 33, 34 and the other part by means of the aerodynamic forces involved.

Figure 8:
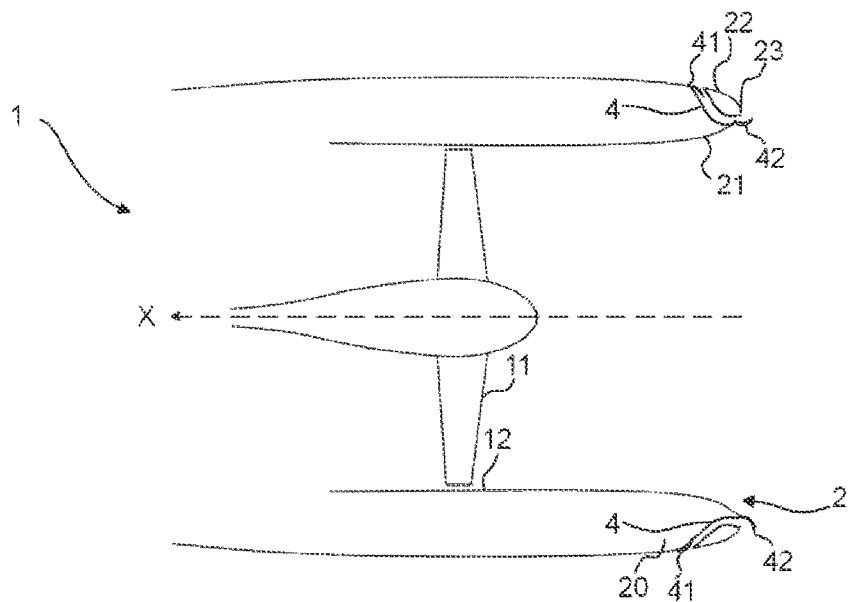
FIG. 8 is a schematic representation in a longitudinal cross-section view of a turbojet engine nacelle, according to a second embodiment of the invention with several circulation conduits opening onto the external wall.
Figure 9A:
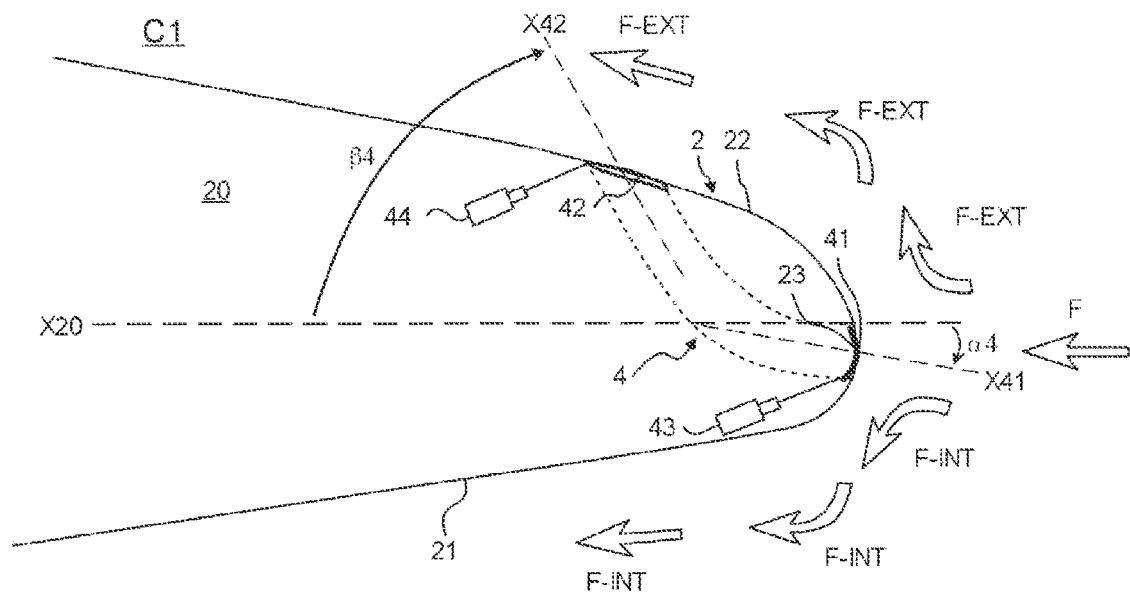
FIG. 9A.

According to a second embodiment of the invention, with reference to FIG. 8, a circulation conduit 4 is represented opening on the one hand at the air intake lip 23 and on the other hand at the external wall 22. As illustrated in FIG. 9A, the upstream end of the circulation conduit 4 is oriented along the upstream direction X41 forming an upstream angle $\alpha 4$ with the longitudinal direction X20, the angle $\alpha 4$ being preferably between $-60°$ and $+60°$. likewise, the downstream end of the circulation conduit 4 is oriented along the downstream direction X42 forming a downstream angle $\beta 4$ with the longitudinal direction X20, the angle $\beta 4$ preferably being between $45°$ and $170°$.

For the sake of clarity and brevity, the description of the elements of the first embodiment is not repeated for the second embodiment, only functional and structural differences are set forth.

Figure 9B:
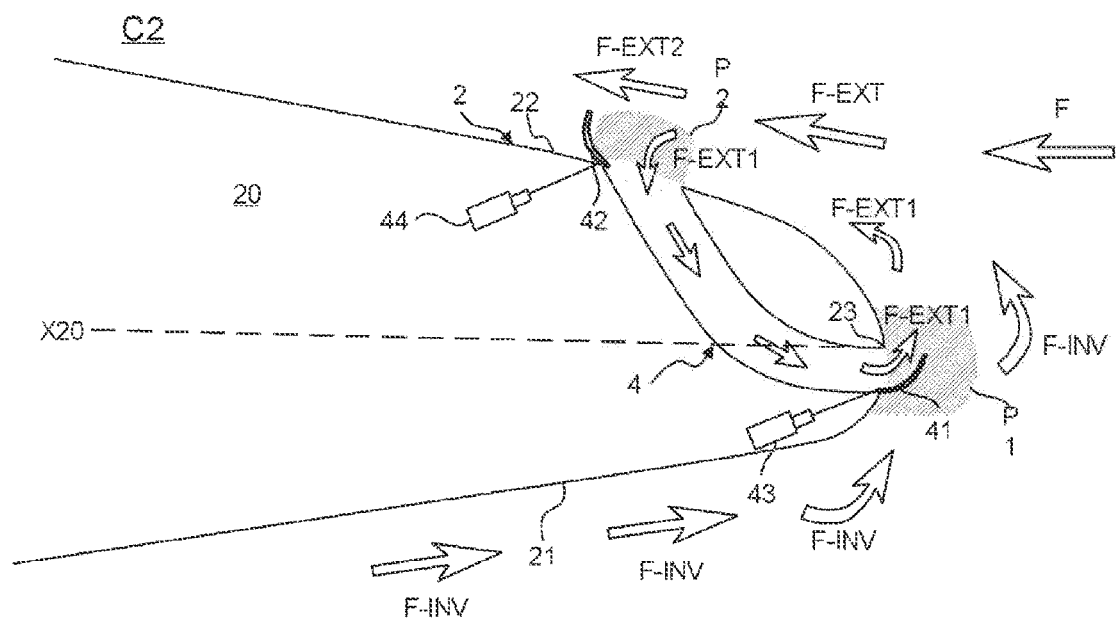
FIG. 9B are schematic representations in a longitudinal cross-section view of an air intake according to the second embodiment comprising controllable moving members at a covered position and an uncovered position respectively.

According to one aspect of the invention, as illustrated in FIGS. 9A and 9B, the upstream cover member 41 is movably mounted in a manner similar to the first embodiment. The downstream cover member 42, on the other hand, is movably mounted between:

the covered position C1 (FIG. 9A) in which the downstream cover member 42 closes the circulation conduit 3 at the external wall 22, in order to promote the thrust phase, and the uncovered position C2 (FIG. 9B) in which the downstream cover member 42 opens the circulation conduit 3 at the external wall 22, in order to promote the thrust reversal phase.

Preferably, according to this second embodiment, the upstream cover member 41 is preferentially mounted to the radially internal edge of the upstream end of the circulation conduit 4, as represented in FIGS. 9A and 9B. Of course, however, the upstream cover member 41 may be mounted to the radially external edge of the upstream end. Likewise, preferentially, the downstream cover member 42 is mounted to the downstream edge of the downstream end of the circulation conduit 4, as represented in FIGS. 9A and 9B. However, it is understood that the downstream cover member 42 may be mounted to the upstream edge of the downstream end.

According to one preferred aspect of the invention and as illustrated in FIG. 9B, in the uncovered position C2, the upstream cover member 41 and the downstream cover member 42 extend externally to the circulation conduit 4 in order to guide the auxiliary external air flow F-EXT1 into and out of the circulation conduit 3, respectively. However, it goes without saying that at least one part of the cover members 41, 42 may extend internally to the circulation conduit 4.

Thus, as illustrated in FIG. 9B, in the uncovered position C2, the upstream and downstream cover members 41 and 42 allow a part of the external air flow F-EXT, referred to as the auxiliary external air flow F-EXT1, to circulate within the circulation conduit 4, with the other portion of the external air flow F-EXT, referred to as the main external air flow F-EXT2, running along the external wall 22. The circulation of the auxiliary external air flow F-EXT1 within the circulation conduit 4 makes it possible to balance the downstream pressure P2, at the external wall 22, with the upstream pressure P1, at the air intake lip 23. In other words, the upstream pressure P1, which is low in prior art (presence of a local depression P) is equalized with the downstream pressure P2 by suction of the auxiliary external air flow F-EXT1. The thrust reversal phase is thus improved.

In the example of FIGS. 9A and 9B, the cover members 41, 42 are moved by the controllable moving members 43, 44 but it goes without saying that the movement could be performed differently, as described in the first embodiment.

By virtue of the invention, whatever the embodiment, the upstream pressure P1 at the air intake lip 23 is increased and/or the air flow output from the air intake 2 is separated from the internal wall 21, thereby judiciously increasing the performance of the aircraft in the reverse thrust phase. Furthermore, the invention does not reduce the performance of the aircraft in the thrust phase by virtue of the cover members 31, 32, 41, 42 which are movably mounted. Furthermore, this invention has a reduced mass and overall size, and is low energy consuming, in particular in the case where the cover members 31, 32, 41, 42 are moved by means of the aerodynamic forces involved.

Analogously to the foregoing, the circulation conduits 4 according to the second embodiment are distributed over the circumference of the air intake 2 about axis X, in a radial row with axis X or two staggered radial rows. Of course, the circulation conduits 4 may be distributed in a different number of rows. The circulation conduits 4 may also be distributed differently at the circumference of the air intake 2, such as over part of the circumference of the air intake 2 as an example. Alternatively, the air intake 2 comprises a single circulation conduit 4 extending over the circumference of the air intake 2 about axis X.

Figure 10A:
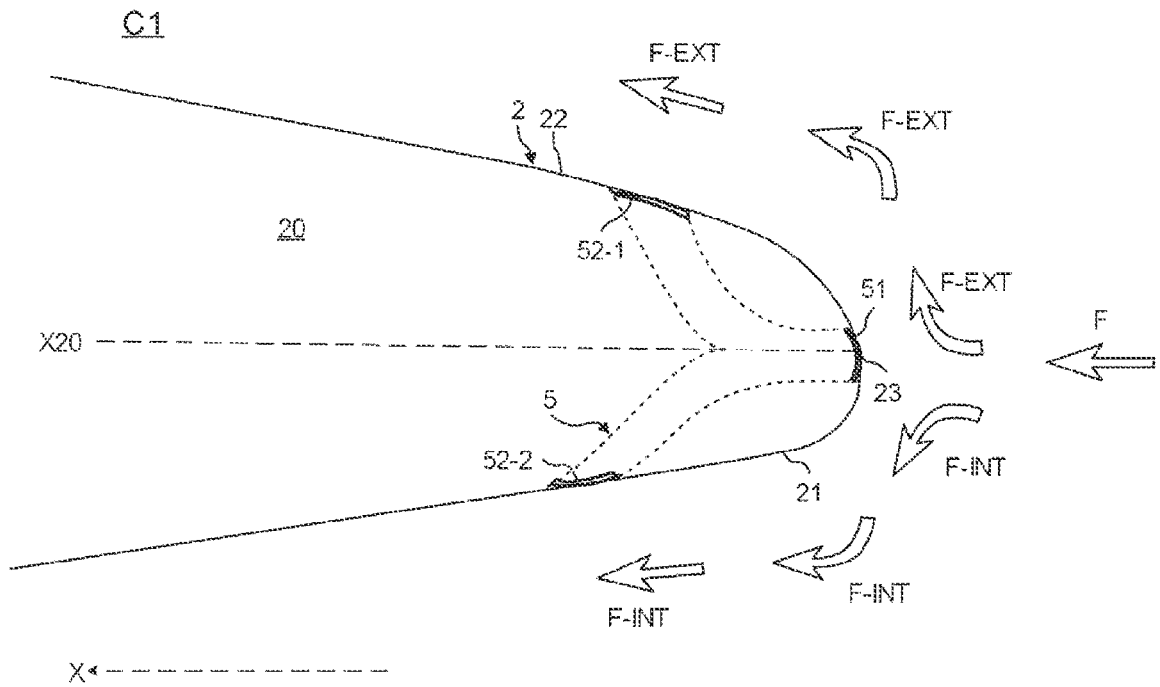
FIG. 10A.
Figure 10B:
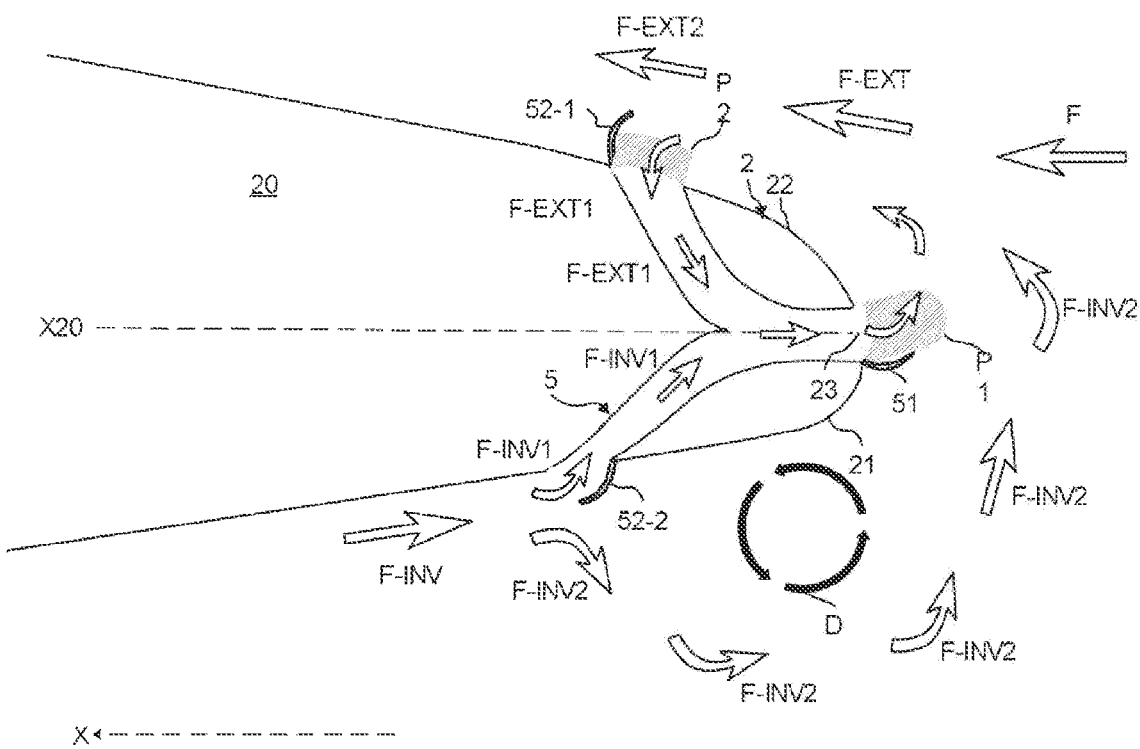
FIG. 10B are schematic representations in a longitudinal cross-section view of an air intake according to a third embodiment with a circulation conduit opening onto the internal wall and onto the external wall.

According to a third embodiment of the invention, with reference to FIGS. 10A and 10B, a circulation conduit 5 opening on the one hand at the air intake lip 23, and on the other hand at the internal wall 21 and the external wall 22 is represented. In this third embodiment, the circulation conduit 5 comprises a first conduit section, analogous to the circulation conduit 3, configured to circulate the auxiliary reverse air flow F-INV1 from the internal wall 21 and a second conduit section, analogous to the circulation conduit 4, configured to circulate the auxiliary external air flow F-EXT1, both of which open into a common conduit section for circulating the auxiliary reverse air flow F-INV1 and the auxiliary external air flow F-EXT1 up to the air intake lip 23.

Preferably, as illustrated in FIGS. 10A and 10B, the circulation conduit 5 comprises an upstream cover member 51 and a first downstream cover member 52-1 movably mounted in a manner similar to the second embodiment. The circulation conduit 5 further comprises a second downstream cover member 52-2 movably mounted in a manner similar to the first embodiment.

Advantageously, as illustrated in FIG. 10B, in the uncovered position C2, the upstream cover member 51 and the first downstream cover member 52-1 allow the auxiliary external air flow F-EXT1 to circulate, thereby balancing the downstream pressure P2 with the upstream pressure P1, at the air intake lip 23. In a complementary way, the upstream cover member 51 and the second downstream cover member 52-2 allow the auxiliary reverse air flow F-INV1 to circulate, thereby separating the reverse air flow F-INV2. The reverse thrust phase is thus optimized by combining advantages of the first embodiment and the second embodiment.

In particular, the three embodiments described have a circulation conduit 3, 4, 5 for deflecting the reverse air flow F-INV homogeneously along the circumference of the air intake 2. However, under some operating conditions, it may be interesting to deflect this reverse air flow F-INV heterogeneously. Thus, two examples are described hereafter with reference to FIGS. 11A and 11B for deflecting the reverse air flow F-INV in a heterogeneous manner.

Figure 11A:
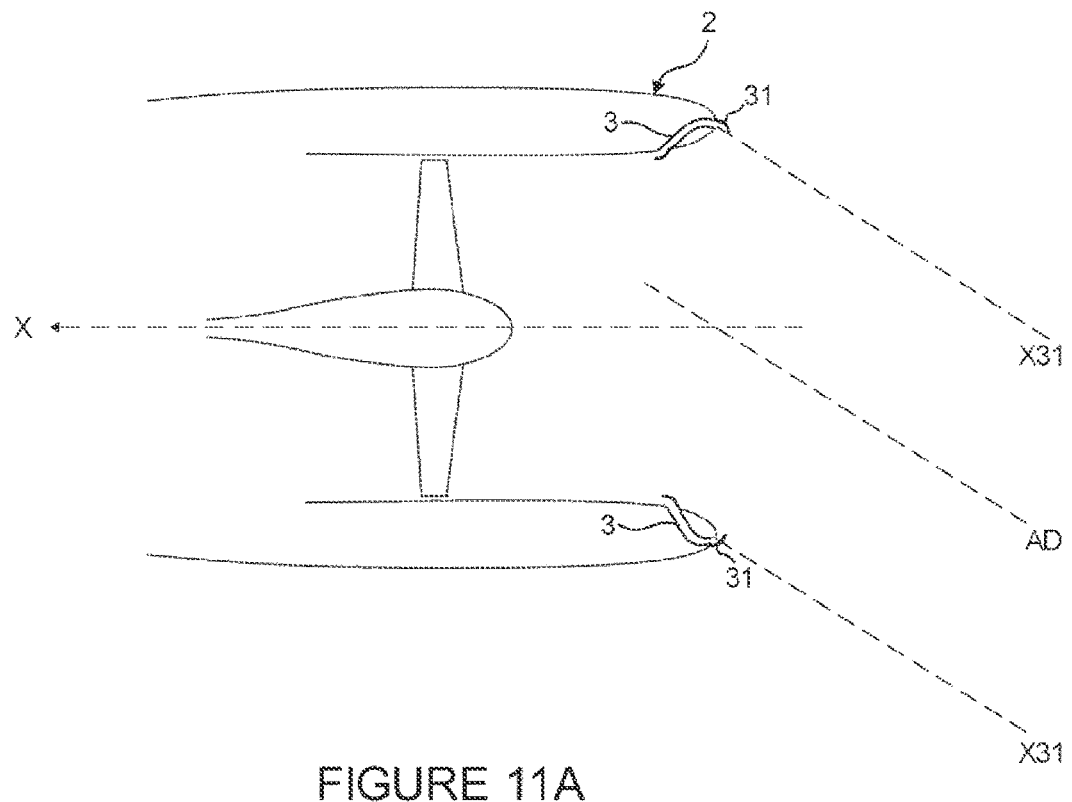
FIG. 11A is a schematic representation in a longitudinal cross-section view of a turbojet engine nacelle allowing heterogeneous recirculation of the reverse air flow, according to the invention.
Figure 11B:
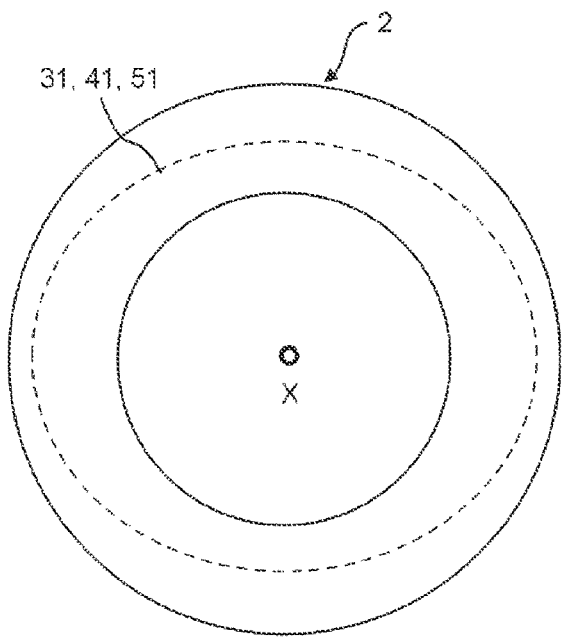
FIG. 11B is a schematic representation in a transverse cross-section view of an air intake allowing heterogeneous recirculation of the reverse air flow, according to the invention.

As illustrated in FIG. 11A, an upstream end 31, 41, 51 can be oriented along different directions at the circumference of the air intake 2 so as to form an air intake lip oriented along a predetermined axis AD. The same applies to the downstream end 32, 42, 52-1, 52-2. Alternatively, with reference to FIG. 11B, the circulation conduits 3, 4, 5 may form an elliptical-, in particular ovoid-shaped, row over the circumference of the air intake 2, in a plane transverse to axis X. In the case of a single circulation conduit 3, 4, 5, this can assume an elliptical shape in a plane transverse to axis X. A heterogeneous deflection advantageously allows the reverse air flow to be guided taking account of the environment of the air intake 2.

A method for operating the air intake 2 according to the invention previously set forth is described below. For the sake of clarity, the movement of a single cover member 31, 32, 41, 42, 51, 52-1, 52-2 is set forth, but it goes without saying that a plurality of upstream cover members 31, 41, 51 and/or downstream cover members 32, 42, 52-1, 52-2 can be moved concomitantly or sequentially.

During the thrust phase, the fan 11 accelerates an internal air flow F-INT from upstream to downstream which is guided by the air intake 2 having an aerodynamic profile promoting the thrust phase. Each cover member 31, 32, 41, 42, 51, 52-1, 52-2 is in the covered position C1 during the thrust phase of the turbojet engine 1, so that the air intake 2 has an aerodynamic profile so as to guide the air flow.

During a thrust reversal phase of said turbojet engine 1, in particular following a modification of the pitch of the fan vanes 11, the cover member 31, 32, 41, 42, 51, 52-1, 52-2 is moved into the uncovered position C2, opening the circulation conduit 3 in order to circulate an air flow balancing the upstream pressure P1 and the downstream pressure P2 and/or generating a separation D of the reverse air flow F-INV from the internal wall 21, in order to promote the thrust reversal phase.

According to one aspect of the invention, the movement step is performed by means of the controllable moving member 33, 34, 43, 44, in a simple and efficient manner. According to another aspect of the invention, it is the aerodynamic forces involved that move the cover members 31, 32, 41, 42, 51, 52-1, 52-2, which has the advantage of being less energy consuming.

Advantageously, such an operating method provides the aircraft with good performance both in the thrust phase, where the internal air flow F-INT is guided by the internal wall 21 towards the fan 11, and in the thrust reversal phase, where the reverse air flow F-INV is deviated from its trajectory running along the internal wall 21 and originating a local depression.

According to an aspect of the invention, in the case of a plurality of circulation conduits 3, 4, 5, only a part of the circulation conduits 3, 4, 5 is opened by the cover members 31, 32, 41, 42, 51, 52-1, 52-2 in order to generate a reverse thrust phase that is heterogeneous over the circumference of the air intake 2, which is advantageous for some operating conditions, such as braking.

According to one aspect of the invention, a circulation conduit 3, 4, 5 comprises several levels of covered position C1, defined by the value of the upstream angle α3, α4 and/or the downstream angle β3, β4. In the case of a plurality of circulation conduits 3, 4, 5, the cover members 31, 32, 41, 42, 51, 52-1, 52-2 can thus advantageously be used according to levels of covered position C1 different from one another. A heterogeneous thrust reversal phase over the circumference of the air intake can thus be generated, which is advantageous for some operating conditions, such as during braking.

The invention claimed is:

1. An aircraft turbojet engine extending along an axis X oriented from upstream to downstream in which an internal air flow circulates from upstream to downstream during a thrust phase and a reverse air flow from downstream to upstream during a thrust reversal phase, said turbojet engine comprising:
   a fan configured so as to provide the reverse thrust;
   a nacelle comprising an air intake having the fan located therein circumferentially extending about the axis X and comprising an internal wall pointing to the axis X and configured to guide the internal air flow and the reverse air flow and an external wall opposite to the internal wall configured to guide an external air flow, the internal wall and the external wall being connected to each other by an air intake lip so as to form an annular cavity;
   said air intake comprising at least one circulation conduit in the annular cavity having a plurality of openings including an opening, at the air intake lip, an opening at the internal wall, and an opening at the external wall, the plurality of openings are configured to promote the thrust reversal phase;
   said air intake comprising at least one cover member having a surface movably mounted between a covered position, in which said at least one cover member closes the circulation conduit at the air intake lip with said surface and an uncovered position, in which said at least one cover member opens the circulation conduit at the air intake lip; and
   wherein internal air flow circulating from upstream to downstream during the thrust phase is along a first direction and reverse air flow from downstream to upstream during the thrust reversal phase is along a second direction, opposite the first direction as viewed relative to the axis X.

2. The aircraft turbojet engine according to claim 1, comprising a plurality of circulation conduits distributed at the circumference of said air intake about axis X.

3. The aircraft turbojet engine according to claim 1, comprising a single circulation conduit circumferentially extending about axis X.

4. The aircraft turbojet engine according to claim 1, comprising at least one downstream cover member movably mounted between a covered position, in which said downstream cover member closes the circulation conduit at the internal wall or the external wall, and an uncovered position, in which said downstream cover member opens the circulation conduit at the internal wall or the external wall.

5. The aircraft turbojet engine according to claim 1, comprising at least one controllable moving member in order to move the at least one cover member from the covered position to the uncovered position.

6. A method for operating the aircraft turbojet engine according to claim 1, comprising, during the thrust reversal phase of said turbojet engine, a step of circulating an air flow in the circulation conduit from the internal wall and/or the external wall to the air intake lip in order to promote the thrust reversal phase.

7. The method according to claim 6, further comprising, a step of moving the at least one cover member to the uncovered position in order to promote the thrust reversal phase.

8. The aircraft turbojet engine according to claim 1, further comprising a pneumatic, hydraulic, or electric actuator coupled to the cover for closing the first opening during the thrust phase and opening the cover during the thrust reversal phase.

9. An aircraft turbojet engine extending along an axis X oriented from upstream to downstream in which an internal air flow circulates from upstream to downstream during a thrust phase and a reverse air flow from downstream to upstream during a thrust reversal phase, said turbojet engine comprising:
   a fan configured so as to provide the reverse thrust;
   a nacelle comprising an air intake and having the fan located therein circumferentially extending about the axis X and comprising an internal wall pointing to the axis X and configured to guide the internal air flow and the reverse air flow and an external wall opposite to the internal wall configured to guide an external air flow, the internal wall and the external wall being connected to each other by an air intake lip so as to form an annular cavity;

said air intake comprising a circulation conduit passing through the annular cavity, said circulation conduit comprising at least two openings, including a first opening at the air intake lip and a second opening downstream of the air intake lip at the internal wall or the external wall;

a cover rotatably mounted at the air intake lip, the cover having a surface for closing the first opening during the thrust phase and opening the first opening in the thrust reversal phase; and wherein internal air flow circulating from upstream to downstream during the thrust phase is along a first direction and reverse air flow from downstream to upstream during the thrust reversal phase is along a second direction, opposite the first direction as viewed relative to the axis X.

10. The aircraft turbojet engine according to claim 9, further comprising a pneumatic, hydraulic, or electric actuator coupled to the cover for closing the first opening during the thrust phase and opening the cover during the thrust reversal phase.

11. The aircraft turbojet engine according to claim 10, wherein the second opening is located at the internal wall and the circulation conduit further comprises a third opening at the external wall.

12. The aircraft turbojet engine according to claim 11, wherein the cover is a first cover and further comprising a second cover rotatably mounted at the second opening and a third cover rotatably mounted at the third opening, the second cover having a surface and the third cover having a surface for closing the second opening and the third opening, respective, during the thrust phase and opening the second opening and the third opening, respectively, in the thrust reversal phase.

13. The aircraft turbojet engine according to claim 10, wherein the cover is a first cover and further comprising a second cover rotatably mounted at the second opening, the second cover having a surface for closing the second opening during the thrust phase and opening the second opening in the thrust reversal phase.

14. The aircraft turbojet engine according to claim 13, wherein the first cover is rotatable outwardly of the annular cavity and the second cover is rotatable inwardly of the annular cavity or the first cover and the second cover are rotatable outwardly of the annular cavity in the thrust reversal phase.

15. The aircraft turbojet engine according to claim 9, wherein the cover is rotatable outwardly of the annular cavity or inwardly into the annular cavity in the thrust reversal phase.

16. The aircraft turbojet engine according to claim 9, wherein the circulation conduit comprises a first circulation conduit, and further comprising a second circulation conduit and a third circulation conduit.

* * * * *